Patented Sept. 14, 1937

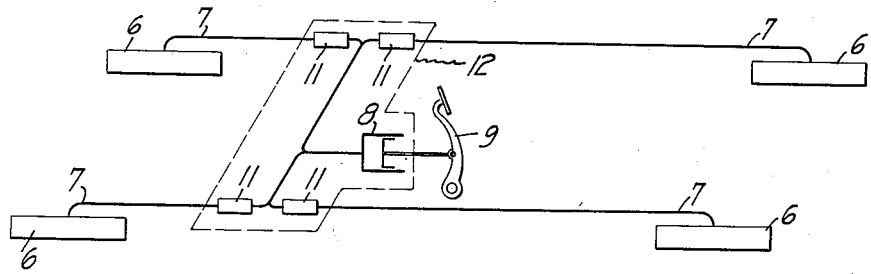
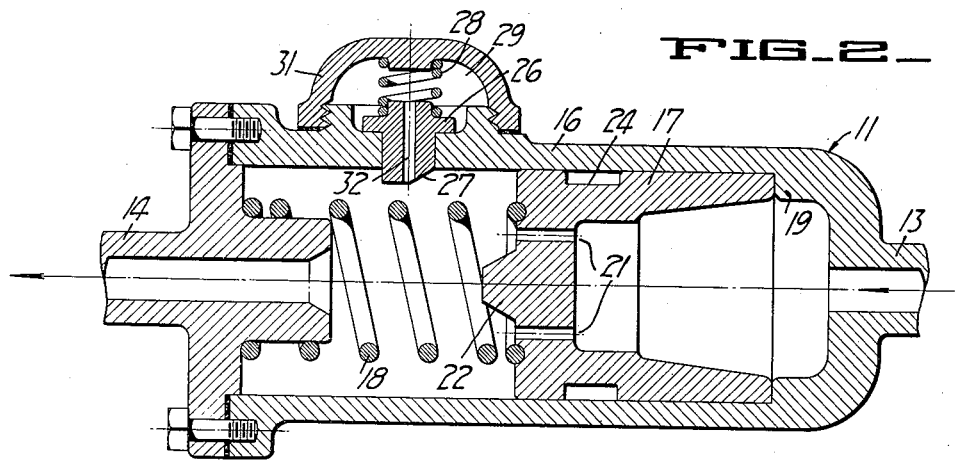
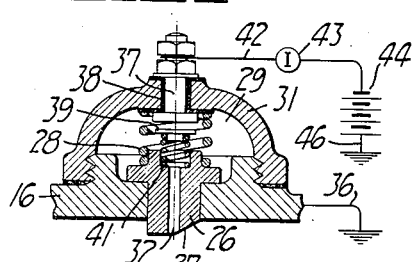
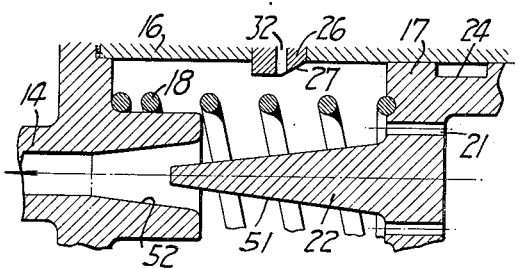
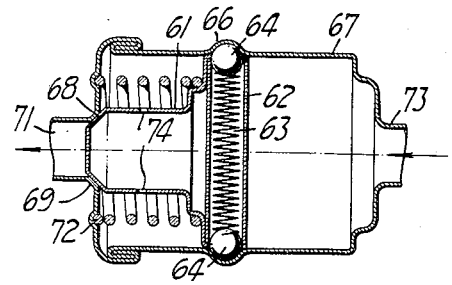
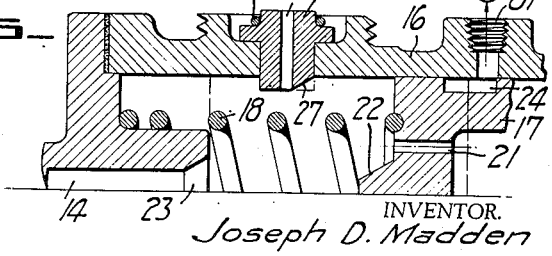

2,093,015

UNITED STATES PATENT OFFICE 2,093,015

HYDRAULIC BRAKE

Joseph D. Madden, Oakland, Calif.

Application October 11, 1935, Serial No. 44,519

2 Claims. (Cl. 303—84)

My invention relates to hydrostatic systems in which a column of liquid is displaced by an actuator to produce a corresponding movement in an actuated device. The invention is especially concerned with a system used in connection with automotive brakes which usually require a plurality of liquid columns. These are interconnected for pressure equalization so that a rupture of any of the liquid-containing lines is apt to disable the entire system and may result in serious consequences.

It is an object of my invention to provide a fully equalized hydraulic system in which a ruptured part does not disable the entire system.

Another object of the invention is to provide means useful in a hydraulic line for preventing excessive flow in said line.

A further object of the invention is to provide an indication of an abnormal condition in a hydraulic line.

A still further object of the invention is to provide an emergency valve in a hydraulic brake system which must be manually released from emergency position.

The foregoing and other objects are attained in the embodiment of the invention illustrated in the drawing, in which—

Fig. 1 is a diagrammatic perspective of a hydraulic brake system in accordance with my invention.

Fig. 2 is a cross-section longitudinally through a valve constructed in accordance with my invention.

Fig. 3 is a cross-sectional detail of an electric circuit-closing switch.

Fig. 4 is an enlarged cross-section of a modified form of valve.

Fig. 5 is a detail of a valve in cross-section, showing a modified form of indicator.

Fig. 6 is a longitudinal cross-section of a modified form of valve in accordance with my invention.

In its preferred form the hydraulic brake of my invention includes an actuating chamber connected by a plurality of hydraulic conduits with a plurality of actuated chambers, there being disposed in each of said conduits a valve ineffective during normal flow in its associated conduit but effective upon abnormal flow in such conduit for preventing flow in said conduit.

Although the hydraulic brake of my invention is susceptible of embodiment in a number of varied forms and can be used in many different environments, it finds an exemplary application in an automotive vehicle having a plurality (usually four) of cylinders 6 or actuated chambers for directly applying the vehicle brakes. The chambers 6 are connected by conduits 7 to a master cylinder 8 or actuating chamber which is operated by a pedal 9. Depression of the pedal 9 contracts the cylinder 8 and transmits hydraulic liquid from the cylinder 8 through the conduits 7 to the individual cylinders 6 which are consequently moved in proportion to the movement of the pedal 9. Springs (not shown) are usually relied upon to restore the chambers 6 and the cylinder 8 to normal position when pressure on the pedal 9 is released. Since the chambers or cylinders 6, the conduits 7 and the master cylinder 8 are usually freely interconnected, the rupture of any of the parts, particularly any of the conduits 7, permits the hydraulic fluid to leak out of the system and to render all of the brakes inoperative. This of course is a potentially dangerous situation. In accordance with my invention, therefore, I provide means such as valves 11 in the hydraulic lines 7, to preclude all of the brakes being disabled upon a breakage occurring in the hydraulic lines 7 or in the chambers 6. The valves 11 can be incorporated within a housing 12 which includes the cylinder 8, if desired, or can be separate bodies included in each of the hydraulic conduits 7.

While each of the valves can be differently designed, I preferably make them all identical and arrange them in detail, for instance as disclosed in Fig. 2. In this instance the conduit 13 leads to the master cylinder 8, while an outflow conduit 14 leads to an associated cylinder 6. Between the conduits 13 and 14 there is an enlarged cylindrical casing 16 within which a piston 17 is adapted to reciprocate. The piston is normally held in one extreme position by a coil spring 18 which encompasses the terminus of the outlet conduit 14 and seats against a face of the piston 17. The proportions of the casing 16 are such that the normal operation of the brake pedal 9 will displace sufficient hydraulic fluid in the conduit inlet 13 to move the piston 17 for a normal stroke in the casing 16, and this normal stroke will correspondingly displace fluid in the casing through the outlet conduit 14 to actuate the associated cylinder 6 in a corresponding amount. This movement of the piston 17 depresses the spring 18 and ordinarily there is little or no flow of hydraulic fluid from one side of the piston 17 to the other. The principal function of such piston, therefore, is to act very much as a diaphragm would act if it where stretched tightly across the casing 16 and simply transmitted pressure from one side thereof to the other without actually permitting the transfer by any liquid. In practice, however, some leakage around the piston 17 occurs, so that the piston would not always tend to return to the same neutral or normal position unless the spring 18 continually urged it against a shoulder 19 in the casing 16 whenever the pressure conditions were such that the spring 18 could be entirely effective.

Since the spring 18 is effective, when the brakes are not being applied, to restore the piston 17 to its normal position despite the fact that some hydraulic liquid may have leaked thereby, I deem it advisable to pierce the piston 17 with bleed apertures 21 which, when the system is quiescent, will permit the normal hydraulic equalization of liquid. The apertures 21 are preferably so small as to be virtually ineffective during application of the brakes but are sufficiently large to permit reasonable equalization of liquid flow when the brakes are not applied. There is thus no sacrifice of complete hydraulic equalization in the system, while at the same time leakage due to necessary mechanical clearances, is in no wise deleterious.

In especial accordance with my invention, in the event there should be a rupture of any of the mechanism on the outlet side 14, and particularly in any of the cylinders 6 or conduits 7, there is provided a means which is responsive to the abnormal resulting hydraulic flow to prevent disablement of the entire system. That is to say, in the event the outflow conduit 14 is ruptured, for example, then no pressure can exist therein except atmospheric, and if the brakes should then be applied a high pressure would result in the inlet conduit 13 in accordance with normal use, but the pressure in the outlet conduit 14 cannot rise materially above atmospheric. This condition produces, upon application of the brake, a very rapid reciprocation of the piston 17 toward the left in Fig. 2, overcoming the effect of the spring 18, which is necessarily rather light, and permitting the fluid on the discharge side of the piston 17 to discharge through the outlet 14. This discharge is stopped abruptly, however, due to the abnormal translation of the piston 17, until such time as a projection 22, acting as a valve, seats in a conical seat 23 formed in the outlet conduit 14, precluding any flow whatsoever from the inlet conduit 13 into the outlet conduit 14. Hydraulic flow in this particular branch of the system is therefore precluded, and the other and remaining portions of the system are free to work in a normal fashion. Instead of a total disability of the brake, therefore, there is only a 25% disability, and the remaining 75% effectiveness contrasts with the zero effectiveness which would ordinarily result upon a rupture of one of the lines.

The piston 17 stays in its abnormal position with the valve 22 seated on the seat 23 as long as the pressure in conduit 13 exceeds the pressure in conduit 14. But for the mechanism to be fully effective, I prefer that the piston 17, once having been abnormally translated to seat the valve 23, be held in such position until released by some special means. For this purpose I provide a latch mechanism, in the present instance including a circumferential groove 24 encompassing the piston 17, with which a cylindrical latch 26 engages when the piston has been translated. An inclined face 27 on the latch 26 permits the latch to ride up over the advancing end of the piston 17 and to be pressed by a coil spring 28 into latching location in the groove 24.

The cylindrical latch 26 is translatable transversely of the casing 16 and operates partially in an auxiliary chamber 29 enclosed by a cap 31 screwed onto the side of the housing 16 in an oil-tight manner. A passage 32 permits interflow between the auxiliary chamber 29 and the main cylinder so that the latch is freely movable. Once the latch has seated in the groove 24, it is necessary for the user to remove the cap 31 and to withdraw the latch 26 from the groove 24 in order that the spring 18 can be effective to restore the piston 17 to its normal position. This is a safety feature which precludes the accidental restoring of the piston 17 without a knowledge of the break which has caused it to move into its abnormal seated position.

In some installations I prefer that an immediately apparent indication be afforded the user of the brakes as soon as the piston 17 has moved into an abnormal position, and, as shown in Fig. 3, in such instance I preferably provide that the casing 16 is included in an electric circuit and is connected by a conductor 36 to ground. In the cap 31 I preferably provide a contact 37 which is insulated from the cap by a bushing 38 and which is adapted to be abutted by a grounding contact 39 held by a light coil spring 41. The conductor 42 includes an indicator 43 in the return circuit which passes through a battery 44 or other suitable source of electricity which is grounded by a conductor 46. With this arrangement, whenever the piston 17 moves toward its abnormal seated position and correspondingly lifts the cylindrical latch 26, the grounding contact 39 is moved to at least momentary abutment with the contact 37 and the electric circuit is energized so that the indicator 43 gives an immediate, clear showing that there has been a failure in one of the brake circuits.

In certain instances it is considered advisable not to isolate entirely one of the brake conduits 7 upon the occurrence of a relatively minor rupture or leak therein, and in such instance I preferably adopt the arrangement disclosed in Fig. 4 in which the piston 17 is provided with a valve 22 having a considerably extended conical valve seat 51 thereon, which is designed to co-operate with the outflow conduit 14 which correspondingly has a relatively long, tapered seat 52 therein. The valve 22 in this arrangement therefore acts as a metering pin and gradually increases the resistance to flow past the seat 52 as the piston 17 moves toward an abnormal position. Preferably the piston 17 is not held by the latch 26 until it has been translated to its extreme abnormal position, but prior to achieving such position throttles or restricts hydraulic flow into the outlet line 14, thereby tending to cause flow toward the other conduits and thus minimizing the loss through the small leakage or rupture presumed to exist in the line 14.

In Fig. 6 there is disclosed an arrangement which is designed to be very cheap in manufacture and to be especially suitable for installation in already existing hydraulic brake systems, and which must be dismantled and, being cheap, can even be discarded after operating once to block flow in the brake line. In this arrangement the piston 61 is of sheet metal and is provided with a cross tube 62 within which a coil spring 63 is located. Balls 64 at opposite ends of the spring are pressed radially outward to engage a peripheral groove 66 formed in the sheet metal casing 67. When the balls are so engaged the piston 61 is in a location with a conical valve 68 seated in an appropriate conical seat 69 in the outlet conduit 71. A coil spring 72 is interposed between the outlet conduit and the piston, in order to urge the piston toward the inlet conduit 73. Bleed apertures 74 provide for equalizing flow back and forth on opposite sides of the piston 61. After this mechanism has moved into flow-blocking position it must be detached from the outlet or inlet line and a tool inserted forcibly to restore the piston 61 to its normal position, since the spring 63 is effective to hold the piston in abnormal latched position even against the spring 72.

In Fig. 5 there is illustrated an arrangement in which hydraulic fluid from behind the piston 17 in abnormal position is by-passed through a hydrostatic line 81 to a hydrostatic pressure indicator 82, in order to afford an indication to the operator that the piston is in an abnormal position. Normally flow into the indicator 82 is blocked by the piston 17 itself, but under abnormal conditions the piston acts as a valve uncovering the conduit 81 and affording an indication as long as the piston is held in latched abnormal position by the latch 26.

I claim:
1. A hydraulic brake comprising a cylindrical housing, means for including said housing in a hydraulic conduit and providing an inlet and an outlet, a valve seat in said housing around said outlet, a piston movable in said housing to reduce the area of and then to seat on said valve seat when said piston moves away from said inlet, said piston having a passage therethrough, means for urging said piston away from said seat, and spring-pressed means on said piston adapted to engage said housing for retaining said piston on said seat.

2. A hydraulic brake comprising a cylindrical housing, means for including said housing in a hydraulic conduit, a conical valve seat in said housing, a piston movable in said housing, a conical projection integral with said piston adapted to seat on said valve seat, said piston having a passage therethrough, means for urging said piston away from said seat, and a latching means for retaining said piston on said seat against the urgency of said urging means.

JOSEPH D. MADDEN.